United States Patent [19]

Uda

[11] Patent Number: 4,975,566
[45] Date of Patent: Dec. 4, 1990

[54] FIRST STAGE CIRCUIT FOR AN OPTICAL RECEIVER

[75] Inventor: Yoshihiro Uda, Tokyo, Japan
[73] Assignee: NEC Corporation, Tokyo, Japan
[21] Appl. No.: 430,040
[22] Filed: Oct. 31, 1989

[30] Foreign Application Priority Data

Oct. 31, 1988 [JP] Japan .................. 63-274749

[51] Int. Cl.$^5$ .................................. H01J 40/14
[52] U.S. Cl. .................................. 250/208.2; 307/311
[58] Field of Search .............. 250/208.2, 210, 214 R, 250/227.11; 307/311, 491, 494

[56] References Cited

U.S. PATENT DOCUMENTS

| | | | |
|---|---|---|---|
| 4,173,723 | 11/1979 | Temes et al. | 307/311 |
| 4,233,505 | 11/1980 | Sato | 250/214 R |
| 4,473,745 | 9/1984 | Chown | 250/214 R |
| 4,495,429 | 1/1985 | Oda et al. | 307/491 |
| 4,498,197 | 2/1985 | Chown | 250/214 R |

Primary Examiner—David C. Nelms
Assistant Examiner—Stephone B. Allen
Attorney, Agent, or Firm—Sughrue, Mion, Zinn, Macpeak & Seas

[57] ABSTRACT

First and second photoelectric converting circuits are provided to be connected to first and second input terminals of a differential amplifier, respectively. The first and second photoelectric converting circuits are optically coupled to a common optical fiber, so that first and second electric signals which are reverse in polarity are supplied to the first and second input terminals. Consequently, noise superposed, for instance, on a power supply line is supplied through the first and second photoelectric converting circuits to the first and second input terminals of the differential amplifier with the same phase as each other, so that the noises are cancelled in the differential amplifier.

2 Claims, 3 Drawing Sheets

FIRST STAGE CIRCUIT FOR AN OPTICAL RECEIVER

FIELD OF THE INVENTION

This invention relates to a first stage circuit for an optical receiver and more particularly, to an optical receiver having a noise cancelling circuit at the first stage thereof.

BACKGROUND OF THE INVENTION

A conventional first stage circuit for an optical receiver comprises a differential amplifier including first and second transistors, first and second direct current bias circuits for applying a bias voltage to respective bases of the first and second transistors of the differential amplifier, and a photoelectric converting circuit including a photodiode for converting an output light emitted from an optical fiber to an electric signal. In the differential amplifier, collectors of the two transistors are connected through resistances to a power supply and directly to output terminals, and emitters thereof are connected through a common resistance to the ground. The photoelectric converting circuit is connected to the base of the first transistor.

In operation, when no light is emitted from the optical fiber, no electric signal is applied from the photoelectric converting circuit to the base of the first transistor of the differential amplifier except for the bias voltage, so that no amplified signal is obtained across the output terminals. On the other hand, when an output light is emitted from the optical fiber, a voltage which is proportional to the output light is applied from the photoelectric converting circuit to the base of the first transistor of the differential amplifier, so that the voltage is amplified in the differential amplifier to be provided at the output terminals.

However, the conventional first stage circuit for the optical receiver has a disadvantage in that a signal to noise ratio is deteriorated. In more detail, where noise is superposed, for instance, on a power supply terminal, an electric signal supplied from the photoelectric converting circuit to the base of the first transistor is affected by the noise, because the photodiode is connected through the terminal to the power supply. As a result, the noise is amplified in the differential amplifier together with the output signal of the photodiode, because the photoelectric converting circuit is connected only to the first transistor. On the contrary, noises supplied through the first and second bias circuits to the differential amplifier do not affect a signal to noise ratio, because the first and second bias circuits are connected to the bases of the first and second transistors symmetrically, so that noises are cancelled in the first and second transistors.

Although this kind of noise is reduced by a noise filter which is provided on a power supply line, as described on pages 209 to 225 of "NIKKEI ELECTRONICS, May 25, 1981", the provision of such a noise filter enlarges the first stage circuit for the optical receiver, and a signal to noise ratio is not completely improved due to noise which is not removed by the noise filter.

SUMMARY OF THE INVENTION

Accordingly, it is an object of the invention to provide a first stage circuit for an optical receiver in which a signal to noise ratio is not deteriorated, even if noise is superposed, for instance, on a power supply line, thereby improving a noise-proof property.

According to the invention, a first stage circuit for an optical receiver, comprises:

a differential amplifier having first and second input terminals and first and second output terminals;

first and second direct current bias circuits for applying an equal bias voltage to the first and second input terminals;

a first photoelectric converting circuit including a first optical device coupled to an optical fiber for converting an output light of the optical fiber to a first electric signal to be applied to the first input terminal of the differential amplifier; and a second photoelectric converting circuit including a second optical device coupled to the optical fiber for converting the output light to a second electric signal to be applied to the second input terminal of the differential amplifier;

wherein the second optical device is connected in the second photoelectric converting circuit to be reverse in polarity with respect to the first optical device, whereby the second electric signal is reverse in polarity with respect to the first electric signal.

BRIEF DESCRIPTION OF THE DRAWINGS

The invention will be explained in more detail in conjunction with appended drawings, wherein.

DESCRIPTION OF THE PREFERRED EMBODIMENT

Before explaining a first stage circuit for an optical receiver in the preferred embodiment according to the invention, the aforementioned conventional first stage circuit for an optical receiver will be explained.

Figure 1:
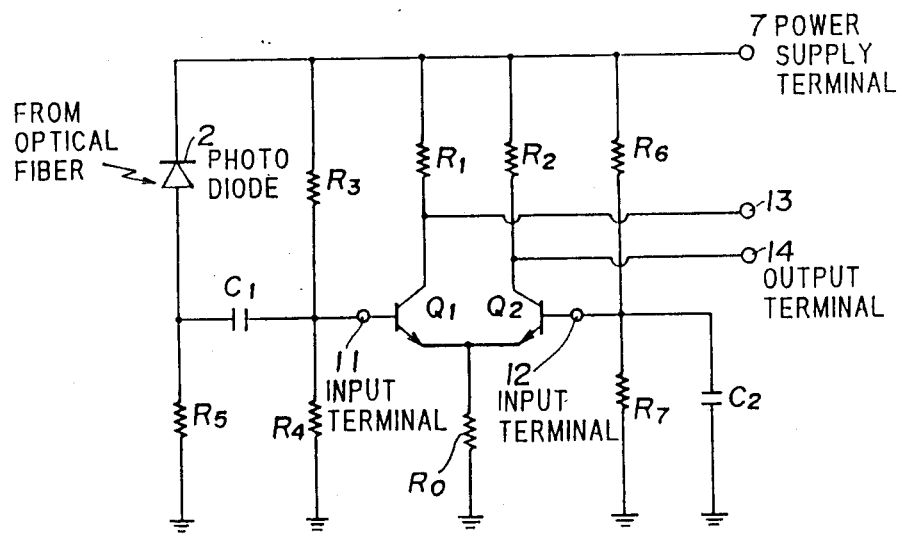
FIG. 1 is a circuitry diagram showing a conventional first stage circuit for an optical receiver.

FIG. 1 shows the conventional first stage circuit for an optical receiver which comprises a differential amplifier including first and second transistors $Q_1$ and $Q_2$ connected at collectors through resistances $R_1$ and $R_2$ to a power supply terminal 7, at emitters through a resistance $R_0$ to the ground, and at bases to input terminals 11 and 12, a first direct current bias circuit including resistances $R_3$ and $R_4$ connected at a connecting point thereof to the input terminal 11 of the differential amplifier, at a terminal opposite to the connecting point of the resistance $R_3$ to the power supply terminal 7, and at a terminal opposite to the connecting point of the resistance $R_4$ to the ground, a second direct current bias circuit including resistances $R_6$ and $R_7$ connected at a connecting point thereof to the input terminal 12 of the differential amplifier, at a terminal opposite to the connecting point of the resistance $R_6$ to the power supply terminal 7, and at a terminal opposite to the connecting point of the resistance $R_7$ to the ground, a photoelectric converting circuit including a photodiode 2 and a resistance $R_5$ connected at a connecting point thereof through a capacitor $C_1$ to the input terminal 11 of the differential amplifier, at a cathode of the photodiode 2 to the power supply terminal 7, and at a terminal opposite to the connecting point of the resistance $R_5$ to the ground and a capacitor $C_2$ connected at a terminal thereof to the input terminal 12 and at the other terminal thereof to the ground. In the first stage circuit for an optical receiver, the collectors of the transistors $Q_1$ and $Q_2$ are connected to output terminals 13 and 14, so that a potential difference between the input terminals 11 and 12 is amplified in the differential amplifier to be provided at the output terminals 13 and 14.

Where noise is superposed, for instance, on a power supply line connected to the power supply terminal 7, the noise is applied through the first direct current bias circuit including the resistances $R_3$ and $R_4$, and the photoelectric converting circuit including the photodiode 2, which provides an optical current proportional to an output light emitted from an optical fiber (not shown), and the resistance $R_5$ to the input terminal 11 of the differential amplifier, and through the second direct current bias circuit including the resistances $R_6$ and $R_7$ to the input terminal 12 of the differential amplifier. In this circumstance, the noises applied through the first and second direct current bias circuits to the input terminals 11 and 12 are cancelled, because the first and second bias circuits are connected to the differential amplifier symmetrically. Consequently, the noise applied through the photoelectric converting circuit to the input terminal 11 is only amplified in the differential amplifier, as explained before. This is a disadvantage of the conventional first stage circuit for an optical receiver.

Next, a first stage circuit for an optical receiver in the preferred embodiment according to the invention will be explained in FIG. 2. The first stage circuit for an optical receiver is of the same circuitry structure as the conventional one, except that a photodiode 20 is provided to be optically coupled to an output light emitted from an optical fiber along with the photodiode 2 for the photoelectric converting circuit, and the capacitor $C_2$ is replaced by a capacitor $C_3$ which is connected at a terminal thereof to a cathode of the photodiode 20, and at the other terminal to the input terminal 12 of the differential amplifier. Further, an anode of the photodiode 20 is connected to the ground, and the cathode thereof is connected through a resistance $R_8$ to the power supply line connected to the power supply terminal 7.

In operation, when an output light is emitted from the optical fiber (not shown), the photodiodes 2 and 20 provide optical currents, the polarity of which is reverse to each other, so that polarity-reverse voltages corresponding to the optical currents are supplied to the input terminals 11 and 12 of the differential amplifier, respectively. Consequently, an amplified output signal is provided at the output terminals 13 and 14 of the differential amplifier in accordance with the difference of the two input voltages.

Figure 3A:
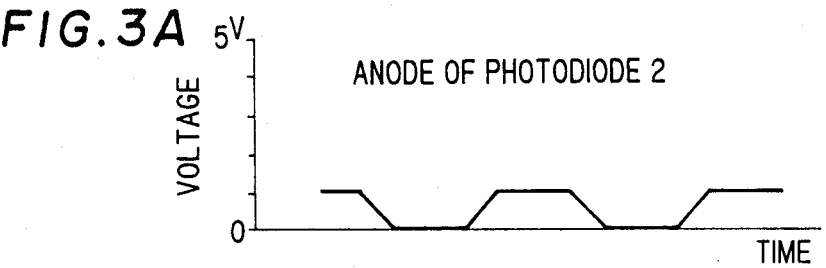
FIGS. 3A to 3E are explanatory diagrams showing voltages in the first stage circuit for an optical receiver in the preferred embodiment according to the invention.
Figure 3B:
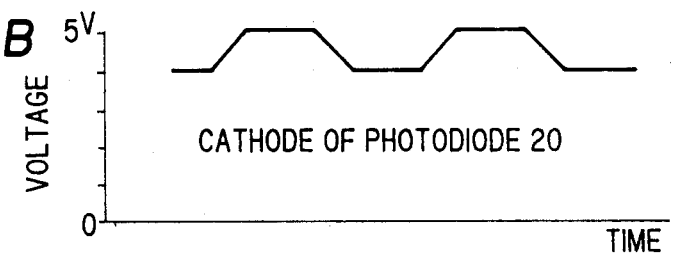
Figure 3C:
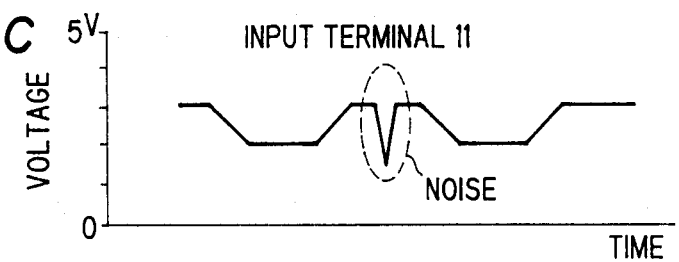
Figure 3D:
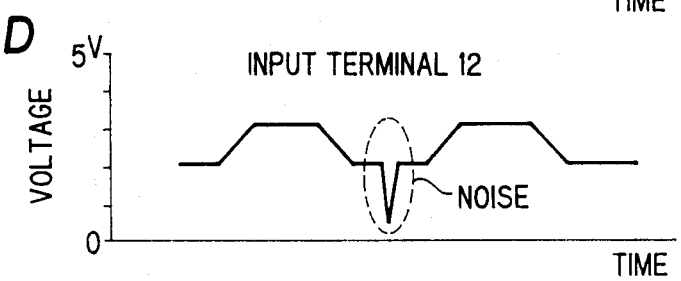
Figure 3E:
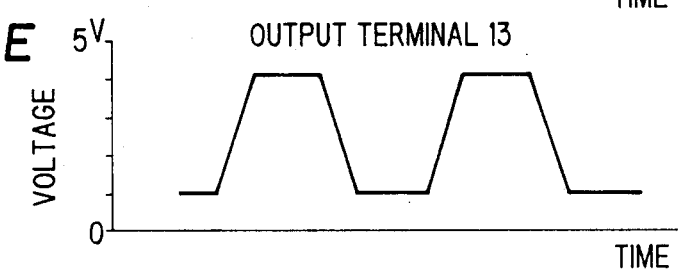

FIG. 3A shows a voltage waveform at the anode of the photodiode 2, and FIG. 3B shows a voltage waveform at the cathode of the photodiode 20, wherein these voltages are reverse in polarity. Further, FIG. 3C shows a voltage waveform including noise as encircled by a dotted line at the input terminal 11, and FIG. 3D shows a voltage waveform also including noise as encircled by a dotted line at the input terminal 12. The input signals having the voltage waveforms as shown in FIGS. 3C and 3D are differentially amplified in the differential amplifier including the transistors $Q_1$ and $Q_2$, so that the noises included in the input signals are cancelled to provide the output signal having no noise at the output terminals 13 and 14, as shown in FIG. 3E.

As described before, the noises supplied through the first bias circuit including the resistances $R_3$ and $R_4$ and the second bias circuit including the resistances $R_6$ and $R_7$ to the differential amplifier are also differentially cancelled therein. This noise cancellation characteristic is decided in accordance with a ratio of removing the same phase input signals applied to the input terminals of the differential amplifier.

The inventor confirmed that the advantage of the invention was definitely obtained in an optical receiver of 0.8 $\mu$m wavelength band which is fabricated on an experimental basis. In the optical receiver, silicon PIN photodiodes were used for the photodiodes 2 and 22, and a commercially available operational amplifier was used for the differential amplifier including the transistors $Q_1$ and $Q_2$. As the result of the experiment in the conventional optical receiver as shown in FIG. 1, an amplitude of noise superposed on the power supply line was 10 mV (peak to peak), when an error occurred with a provability of $10^{-9}$ in an output signal of the optical receiver.

Figure 2:
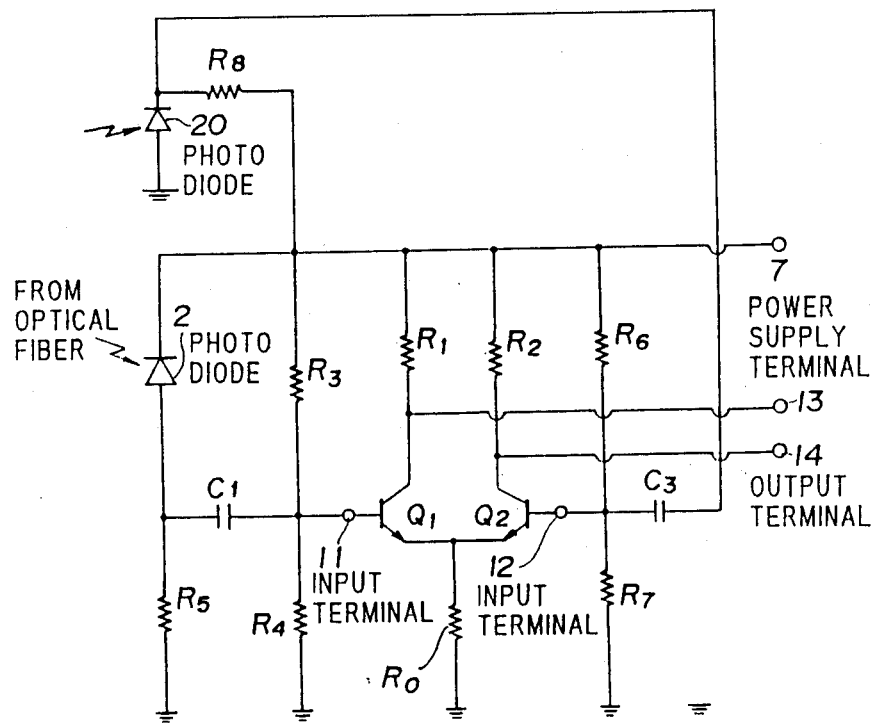
FIG. 2 is a circuitry diagram showing a first stage circuit for an optical receiver in a preferred embodiment according to the invention.

On the other hand, the noise amplitude was increased in the optical receiver of the invention as shown in FIG. 2 to 100 mV (peak to peak) to provide the same error provability as the conventional one. This means that a signal to noise ratio is improved in the invention by approximately 20 dB, as compared to the conventional circuit.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A first stage circuit for an optical receiver, comprising:
    a differential amplifier having first and second input terminals and first and second output terminals;
    first and second direct current bias circuits for applying an equal bias voltage to said first and second input terminals;
    a first photoelectric converting circuit including a first optical device coupled to an optical fiber for converting an output light of said optical fiber to a first electric signal to be applied to said first input terminal of said differential amplifier; and
    a second photoelectric converting circuit including a second optical device coupled to said optical fiber for converting said optical light to a second electric signal to be applied to said second input terminal of said differential amplifier;
    wherein said second optical device is connected in said second photoelectric converting circuit to be reverse in polarity with respect to said first optical device, whereby said second electric signal is reverse in polarity with respect to said first electric signal.

2. A first stage circuit for an optical receiver, according to claim 1,
    wherein said differential amplifier includes first and second transistors, collectors of said first and second transistors being connected in parallel to a power supply line, emitters of said first and second transistors being connected commonly to the ground, and bases of said first and second transistors being connected to said first and second input terminals;

said first optical device of said first photoelectric converting circuit having a first electrode connected to said power supply line and a second electrode connected to said first input terminal of said differential amplifier; and said second optical device of said second photoelectric converting circuit having a first electrode connected to said power line and said second input terminal of said differential amplifier and a second electrode connected to the ground.

* * * * *